US006661523B1

(12) United States Patent
Rubinstein et al.

(10) Patent No.: US 6,661,523 B1
(45) Date of Patent: *Dec. 9, 2003

(54) METHOD FOR DETERMINING AND DESIGNING OPTICAL ELEMENTS

(75) Inventors: Jacob Rubinstein, Misgav (IL); Gershon Moshe Wolansky, Jerusalem (IL)

(73) Assignee: Inray Ltd., Upper Galilee (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/332,585

(22) Filed: Jun. 14, 1999

Related U.S. Application Data

(63) Continuation-in-part of application No. 09/198,970, filed on Nov. 23, 1998, now Pat. No. 6,256,098.

(51) Int. Cl.[7] .............................................. G01B 11/24
(52) U.S. Cl. ...................................... 356/601; 356/612
(58) Field of Search ................................ 356/124, 128, 356/376, 348, 359, 360, 612, 601, 239.1, 239.2, 239.7, 127, 125; 359/715, 773, 356, 365, 743; 351/169

(56) References Cited

U.S. PATENT DOCUMENTS

| | | | |
|---|---|---|---|
| 3,868,589 A | * | 2/1975 | Wang .......................... 372/96 |
| 3,947,127 A | | 3/1976 | Bennett et al. |
| 4,315,673 A | | 2/1982 | Guilino et al. |
| 4,377,341 A | * | 3/1983 | Task et al. ................ 356/239.1 |
| 4,398,822 A | * | 8/1983 | Task ......................... 356/239.1 |
| 4,606,622 A | | 8/1986 | Fuëter et al. |
| 4,838,675 A | * | 6/1989 | Barkan et al. ............... 351/169 |
| 5,301,004 A | * | 4/1994 | Percival et al. ............. 356/125 |
| 5,581,347 A | | 12/1996 | Le Saux et al. |
| 5,726,749 A | * | 3/1998 | Schave .................... 356/239.1 |
| 5,771,089 A | | 6/1998 | Barth |
| 5,784,144 A | | 7/1998 | Kelch et al. |
| 6,256,098 B1 | * | 7/2001 | Rubinstein et al. ......... 356/376 |

OTHER PUBLICATIONS

G.H. Guilino, "Design Philosophy for Progressive Addition Lenses", Applied Optics, vol. 32, pp. 111–117, 1993.
M. Born and E. Wolf, "Principles of Optics", Pergamonn Press, 1980.
D. Malacara, "Optical Shop Testing", John Wiley & Sons Inc., 1992.
G. Rousset, "Wavefront Sensing", Applied Optics for Astronomy, D.M. Alloin and J.M. Mariotti (eds.), pp. 115–138 Kluwer, 1994.
S.G. Michlin, "The Numerical Performance of Variational Methods", Wolters–Noordhoff, 1971, (Netherlands), whole book.
Marvin J. Forray, "Variational Calculus in Science and Engineering", McGraw–Hill, 1960, whole book.
I.M. Gelfand et al. "Calculus of Variations", Prentice–Hall 1963, whole book.
A.E. Conrady, Applied Optics and Optical Design, pp. 84–113.

* cited by examiner

*Primary Examiner*—F. L. Evans
*Assistant Examiner*—Roy M. Punnoose
(74) *Attorney, Agent, or Firm*—Eitan, Pearl, Latzer & Cohen, Zedek, LLP

(57) ABSTRACT

A method for determining or designing the topography of at least one unknown surface of an optical element includes the steps of measuring or prescribing geometrical properties, determining a set of integration equations from the geometrical properties, and determining the topography of the at least one unknown surface from the set of equations. The set of integration equations is determined also from the optical index or indexes of the optical element. The geometrical properties measured or prescribed are the geometric properties of a plurality of rays incident upon the optical element and of a corresponding plurality of rays affected by at least the at least one unknown surface.

14 Claims, 10 Drawing Sheets

METHOD FOR DETERMINING AND DESIGNING OPTICAL ELEMENTS

CROSS-REFERENCE TO PREVIOUS APPLICATIONS

This application is a continuation-in-part of U.S. Ser. No. 09/198,970 filed Nov. 23, 1998, now U.S. Pat. No. 6,256,098 to Rubinstein et al., issued Jul. 3, 2001, which is incorporated by reference herein in its entirety.

FIELD OF THE INVENTION

The present invention relates to methods for determining and designing optical elements such as lenses and mirrors, in general, and to a method for determining and designing the topography of optical elements, in particular.

BACKGROUND OF THE INVENTION

Methods for determining and designing optical elements, such as lenses and mirrors, are known in the art. These methods attempt to provide accurate surfaces for uni-focal optical elements and near accurate surfaces for multi-focal optical elements. Multi-focal lenses and mirrors provide a plurality of focal points, each for a different area in the optical element.

When designing an optical element, the designer determines a list of requirements which restrict the final result. Such requirements can include a general geometry of the requested surface, a collection of optical paths which have to be implemented in the requested surface and the like. Such optical paths can be determined in theory or as measurements of the paths of light rays, which include a plurality of rays, through the optical element.

According to one method, which is known in the art, an optical surface is determined according to a preliminary given surface, which is characterized by a finite number of parameters. The method calculates an optimal choice of the parameters, thereby determining the desired optical surface. The representation of the calculated optical surface can be given by polynomials or other known special functions.

It will be appreciated by those skilled in the art that such optical surfaces are limited in that the optimization is obtained according to a limited and finite number of parameters, while the number of restrictions can be significantly larger.

G. H. Guilino, "Design Philosophy For Progressive Addition Lenses", Applied Optics, vol. 32, pp. 111–117, 1993, provides a thorough survey of the methods for design principles of multi-focal lenses.

U.S. Pat. No. 4,315,673, to Guilino et al. is directed to a progressive power ophthalmic lens. Guilino describes a specific geometry, which utilizes specific functions to achieve an optical surface with varying power.

U.S. Pat. No. 4,606,622 to Fueter et al. is directed to a multi-focal spectacle lens with a dioptric power varying progressively between different zones of vision. Fueter describes a method for determining a surface according to a plurality of points. The method defines a twice continuously differentiable surface through these points. The surface is selected so as to achieve a varying optical surface power.

It is common practice in the industry to design optical elements consisting of several lenses (and thus several refractive surfaces). The designer of a complex optical element such as a camera has a finite and predetermined set of lenses at his disposal. The designer imposes requirements on the performance of the optical element, and then uses software to optimize the performance by choosing an optimal choice of lenses from the predetermined set. It will be appreciated that this approach limits the design of the optical element to the large but finite number of combinations of the predetermined set of lenses.

U.S. Pat. No. 5,581,347 to Le Saux et al. is directed to a method and device for measurement of an optical surface. A surface in the optical element is illuminated by light with a known wavefront. The slopes of the wavefront after reflection from or refraction by the surface are measured. An iterative process, starting from a given initial surface, attempts to find a surface that minimizes a predetermined merit function.

SUMMARY OF THE INVENTION

The present invention provides a novel method for determining surfaces of optical elements, which overcome the disadvantages of the prior art.

A method for determining the topography of at least one unknown surface of an optical element, the method including the steps of measuring geometrical properties, determining a set of integration equations from the geometrical properties and from the optical index or indexes of the optical element, and determining the topography of the at least one unknown surface from the set of equations. The geometrical properties measured are of a plurality of rays incident upon the optical element and of a corresponding plurality of rays affected by at least the at least one unknown surface.

There is also provided in accordance with a preferred embodiment of the present invention a method for designing an optical element having at least one unknown surface. The method includes the steps of prescribing geometrical properties, determining a set of integration equations from the geometrical properties and from the optical index or indexes of the optical element, and determining the topography of the at least one unknown surface from the set of equations. The geometrical properties prescribed are of a plurality of rays incident upon the optical element and of a corresponding plurality of rays affected by at least the at least one unknown surface.

Moreover, in accordance with a preferred embodiment of the present invention, the affected rays are refracted by at least one of the at least one unknown surface.

Alternatively, in accordance with a preferred embodiment of the present invention, the affected rays are reflected by at least one of the at least one unknown surface.

Furthermore, in accordance with a preferred embodiment of the present invention, the step of determining the topography includes the step of detecting whether the set of integration equations is solvable. When the set of integration equations is solvable, the set of integration equations is integrated, thereby determining the topography of the at least one surface. When the set of integration equations is not solvable, a function and auxiliary conditions for the set of integration equations are determined, and the function is optimized subject to the auxiliary conditions, thereby determining the topography of the at least one surface.

There is also provided in accordance with a preferred embodiment of the present invention a method for determining the topography of two unknown surfaces of an optical element. The method includes the step of measuring locations and directions of a plurality of rays incident upon the optical element and of a corresponding plurality of rays affected by at least the two unknown surfaces. The method also includes the steps of determining a set of integration equations from the locations and directions and from the optical index or indexes of the optical element, and determining the topography of the two unknown surfaces from the set of equations.

There is also provided in accordance with a preferred embodiment of the present invention a method for designing an optical element having two unknown surfaces. The method includes the step of prescribing locations and directions of a plurality of rays incident upon the optical element and of a corresponding plurality of rays affected by at least the two unknown surfaces. The method also includes the steps of determining a set of integration equations from the locations and directions and from the optical index or indexes of the optical element, and determining the topography of the two unknown surfaces from the set of equations.

Moreover, in accordance with a preferred embodiment of the present invention, the affected rays are refracted by at least one of the two unknown surfaces.

Alternatively, in accordance with a preferred embodiment of the present invention, the affected rays are reflected by at least one of the two unknown surfaces.

Furthermore, in accordance with a preferred embodiment of the present invention, the step of determining the topography includes the step of detecting whether the set of integration equations is solvable. When the set of integration equations is solvable, the set of integration equations is integrated, thereby determining the topography of the two unknown surfaces. When the set of integration equations is not solvable, a function and auxiliary conditions for the set of integration equations are determined, and the function is optimized subject to the auxiliary conditions, thereby determining the topography of the two unknown surfaces.

Moreover, in accordance with a preferred embodiment of the present invention, the method further includes step of determining a first reference plane from the locations and directions, wherein the integration equations include $$f_x = \frac{u_1 + (f - h_1)[u_1(\alpha/\gamma)_x + u_2(\beta/\gamma)_x]}{1 - (u_1\alpha/\gamma + u_2\beta/\gamma)} \equiv e1$$

$$f_y = \frac{u_2 + (f - h_1)[u_1(\alpha/\gamma)_y + u_2(\beta/\gamma)_y]}{1 - (u_1\alpha/\gamma + u_2\beta/\gamma)} \equiv e2$$

$$g_x = \frac{v_1\xi_x + v_2\eta_x + (g - h_2)[v_1(a/c)_x + v_2(b/c)_x]}{1 - (v_1 a/c + v_2 b/c)} \equiv e3$$

$$g_y = \frac{v_1\xi_y + v_2\eta_y + (g - h_2)[v_1(a/c)_y + v_2(b/c)_y]}{1 - (v_1 a/c + v_2 b/c)} \equiv e4.$$

wherein $$u_1 = \frac{n_2 dx - n_1\alpha}{n_1\gamma - n_2 dz}, \quad u_2 = \frac{n_2 dy - n_1\beta}{n_1\gamma - n_2 dz}, \quad v_1 = \frac{n_2 dx - n_3 a}{n_3 c - n_2 dz}, \text{ and}$$

$$v_2 = \frac{n_2 dy - n_3 b}{n_3 c - n_2 dz};$$

$$(dx, dy, dz) = \frac{1}{D}(Dx, Dy, Dz),$$

$$Dx = \xi - x + \frac{a}{c}(g - h_2) - \frac{\alpha}{\gamma}(f - h_1),$$

$$Dy = \eta - y + \frac{b}{c}(g - h_2) - \frac{\beta}{\gamma}(f - h_1),$$

$$Dz = g - f \quad \text{and} \quad D = \sqrt{Dx^2 + Dy^2 + Dz^2};$$

$h_1$ denotes the height of a second reference plane above the first reference plane;

$h_2$ denotes the height of a third reference plane above the first reference plane;

x and y denote the geometrical location of each of the incident rays on the second reference plane;

$\xi$ and $\eta$ denote the geometrical location of each of the affected rays on the third reference plane;

$n_1$ denotes the optical index with respect to the incident rays;

$n_2$ denotes the optical index between the two unknown surfaces;

$n_3$ denotes the optical index with respect to the affected rays;

f denotes the height of one of the two unknown surfaces above the first reference plane;

g denotes the height of another of the two unknown surfaces above the first reference plane;

$(\alpha, \beta, \gamma)$ denotes the direction vector of each of the incident rays; and $(a, b, c)$ denotes the direction vector of each of the affected rays.

Furthermore, in accordance with a preferred embodiment of the present invention, the function is determined as $$E = \int [w_1(f_x - e1)^2 + w_2(f_y - e2)^2 + w_3(g_x - e3)^2 + w_4(g_y - e4)^2] dxdy,$$

and $w_i(x, y, f, g, \nabla f, \nabla g)$, $i = 1, 2, 3, 4$ are general weight functions.

There is also provided in accordance with a preferred embodiment of the present invention an optical element having at least one surface, the surface having a topography which is determined by the design method described hereinabove.

There is also provided in accordance with a preferred embodiment of the present invention a mold for producing an optical element having at least one surface, the surface having a topography which is determined by the design method described hereinabove.

There is also provided in accordance with a preferred embodiment of the present invention a mold for producing an optical element, the mold having a surface whose topography is determined by the design method described hereinabove.

There is also provided in accordance with a preferred embodiment of the present invention a measuring device for determining the topography of two unknown surfaces of an optical element. The measuring device includes a first optical system for measuring locations and directions of rays incident on the optical element, a second optical system for measuring locations and directions of rays affected at least by the two unknown surfaces, and software means for determining the topography of the two unknown surfaces from the locations and directions and from optical properties of the optical element.

There is also provided in accordance with a preferred embodiment of the present invention a measuring device for determining the topography of an unknown surface of an optical element. The measuring device includes a first optical system for measuring either of locations and directions of rays incident on the optical element, a second optical system for measuring locations and directions of rays affected at least by the unknown surface, and software means for determining the topography of the unknown surface from a set of integration equations, the set of integration equations determined from the locations and directions and from optical properties of the optical element.

There is also provided in accordance with a preferred embodiment of the present invention a measuring device for determining the topography of an unknown surface of an optical element. The measuring device includes a first optical system for measuring locations and directions of rays incident on the optical element, a second optical system for measuring either of locations and directions of rays affected at least by the unknown surface, and software means for determining the topography of the unknown surface from a set of integration equations, the set of integration equations determined from the locations and directions and from optical properties of the optical element.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention provides a novel method for designing optical elements such as lenses and mirrors, which overcomes the disadvantages of prior art. The present invention also provides a novel method for designing the topography of molds for optical elements such as lenses and mirrors.

In addition, the present invention provides a method for determining the geometry of optical elements, such as lenses and mirrors, from optical measurements, which overcomes the disadvantages of prior art.

According to one aspect of the invention, there is provided a procedure for designing refractive or reflective surfaces, in such a way that the surfaces will optimally transmit or reflect a beam of rays in a desired fashion.

According to another aspect of the invention, there is provided a procedure for determining refractive or reflective surfaces from measurements on rays passing there through (or reflected by) them.

The method of the present invention is particularly suitable (but not limited) to the design of progressive multifocal lenses.

Figure 1:
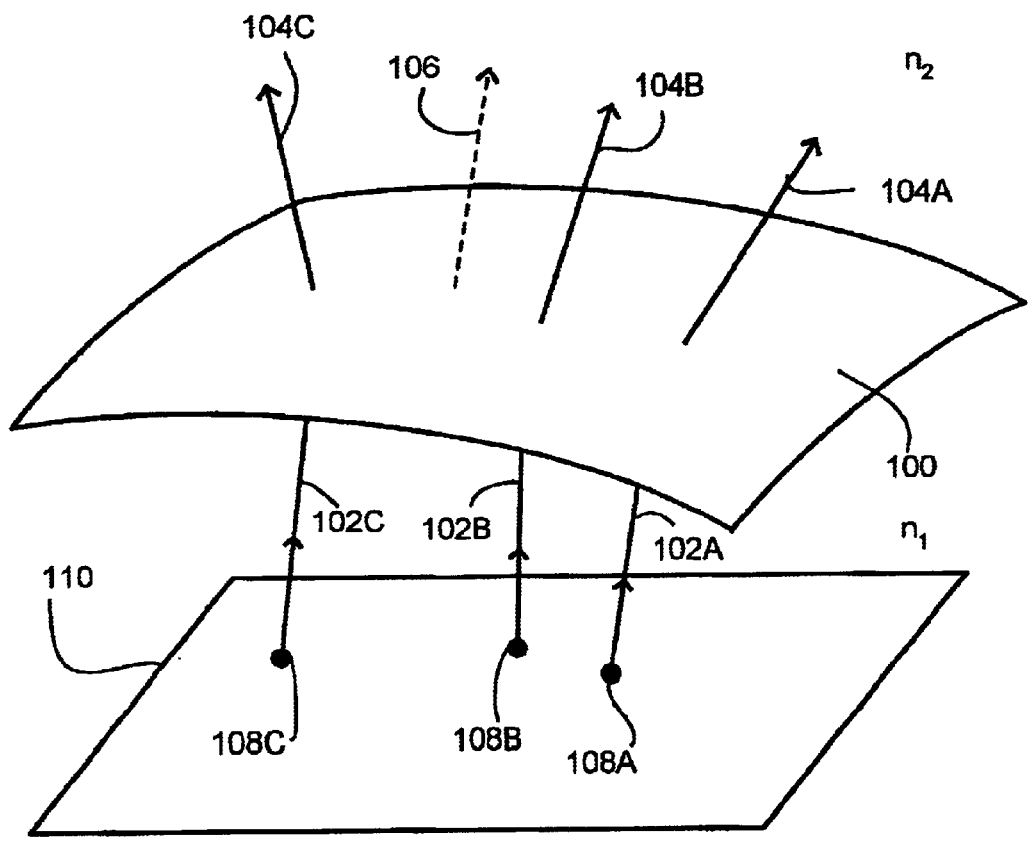
FIG. 1 is a schematic illustration of a refractive surface and a set of light rays, constructed and operative in accordance with a preferred embodiment of the invention.

Reference is now made to FIG. 1, which is a schematic illustration of a refractive surface, generally referenced 100 and a set of light rays, constructed and operative in accordance with a preferred embodiment of the present invention.

Optical surface 100 separates between two optical mediums, having refractive indexes of $n_1$ and $n_2$, respectively. Light rays 102A, 102B and 102C originate from points 108A, 108B and 108C and are directed at surface 100. Surface 100 refracts each light ray 102A, 102B and 102C into a respective ray 104A, 104B and 104C. Arrow 106 denotes the normal vector to the surface 100. It is noted that the number of light rays can be selected by the designer.

It will be appreciated by those skilled in the art that the characteristics of rays 102A, 102B and 102C can be provided in a plurality of formats known in the art. Hence, it is noted that a reference surface such as reference plane 110, can be determined according to any such characteristics. For example, the reference plane 110 can easily be defined from the exact geometric description in space, of each of the rays 102.

The present invention uses a function f to define the surface 100. f is positioned with respect to a reference x-y plane 110. A point (x,y) on the reference plane 110 denotes the origin of a ray, which is emitted towards the optical surface 100 to be determined. The height of f (surface 100) above plane 110 is given by f(x,y). It is noted that the use of a reference plane with respect to the description provided herewith is not restricted to common flat planes, rather any type of surface can be used for this purpose.

The position of the rays 102 at any point on the reference plane 110 is given, together with their direction vector $w_1(x,y)$.

According to this aspect of the invention, only the direction of each of the refracted rays is known and is represented by a direction vector $w_2(x,y)$ for each ray.

According to the invention, the direction vector of each ray 102, is represented by $w_1=(\cos\phi\cos\theta,\sin\phi\cos\theta,\sin\theta)$, and the direction vector of the refracted ray is represented by $w_2=(a,b,c)$.

Then, the intersection point (x0,y0,z0) of a selected ray 102 with the surface 100 f is given by:

$$x0=x+f\cos\phi\cot\theta, y0=y+f\sin\phi\cot\theta, z0=f. \tag{1}$$

The law of refraction, described in M. Born and E. Wolf, "Principles of Optics", Pergamonn Press, 1980, can therefore be written as $$n_1 w_1 \times v = n_2 w_2 \times v, \tag{2}$$

where v, which is defined as $v=(f_{x0},f_{y0},-1)$, denotes the normal to surface 100 f at any point (x0,y0,f) thereon, $f_{x0},f_{y0}$ denote the partial derivatives of the surface f with respect to x0 and y0 respectively, and × denotes the vector product (vector multiplication operator) between two vectors. It is noted that Equation (2) can be written slightly differently as $n_1w_1-n_2w_2=sv$, where s denotes a proportionality constant.

Equating the coefficients of the vector Equation (2) we obtain two equations for the derivatives of f:

$$f_{x0} = \frac{n_2 a - n_1 \cos\phi\cos\theta}{n_1 \sin\theta - n_2 c} = u_1 \text{ and} \tag{3}$$

$$f_{y0} = \frac{n_2 b - n_1 \sin\phi\cos\theta}{n_1 \sin\theta - n_2 c} = u_2.$$

The method of the invention constructs the surface f by integrating the system of Equations (3).

Applicants found that it is more convenient to eliminate the intersection points (x0,y0,f) using Equation (1). For this purpose, f is defined as $f=f(x0(x,y),y0(x,y))$. The derivatives of f are provided with respect to x and y, using the chain rule and Equation (1). Accordingly, the following expression is obtained:

$$f_x = \frac{u_1 + f[u_1(\cos\phi\cot\theta)_x + u_2(\sin\phi\cot\theta)_x]}{1 - \cot\theta(u_1\cos\phi + u_2\sin\phi)} = F_1, \quad (4)$$

$$f_y = \frac{u_2 + f[u_1(\cos\phi\cot\theta)_y + u_2(\sin\phi\cot\theta)_y]}{1 - \cot\theta(u_1\cos\phi + u_2\sin\phi)} = F_2.$$

The system of Equations (4) can now be integrated to determine the surface f. In general, the location of a single point $p=(xi,yi,f(xi,yi))$ on the surface f may be required, to serve as an initial condition for the solution process. It will be noted that for most cases, the vertex of the surface f can be used, although any other reference point will provide adequate results.

According to one aspect of the present invention, the designer of the optical element, according to the present invention, can provide information relating to the directions and locations of the rays 102 and the refracted rays 104, to direct the calculation to obtain certain predetermined requirements, in the design procedure.

Alternatively, this information can be provided from actual measurements when attempting to determine a surface of an existing optical element, using conventional measurement equipment, as will be described herein below.

A variety of measuring methods and systems are provided in D. Malacara, "Optical Shop Testing", John Wiley & Sons Inc., 1992, as well as in G. Rousset, "Wave Front Sensing", Applied Optics for Astronomy, D. M. Alloin and J. M Mariotti (eds.), pp. 115–138, Kluwer, 1994, which disclosure is incorporated by reference. For example, a Hartman sensor or curvature sensor could be used.

It is important to note that Equations (4) are only solvable under the special compatibility condition which requires that the two-dimensional mixed derivative calculated at any point in the surface f is the same, regardless of the axial order of its calculation so that $f_{xy}=f_{yx}$, or using the notation of Equation 4, $F_{1y}=F_{2x}$.

The present invention provides a method for solving Equation (4), in a case where the originating points, such as points 108 (FIG. 1) and 154 (FIG. 4) are given on a discrete grid. It is noted that the present example, relates to a rectangular grid, which can be expanded to any other type of grid, by way of linear combinations.

Figure 2:
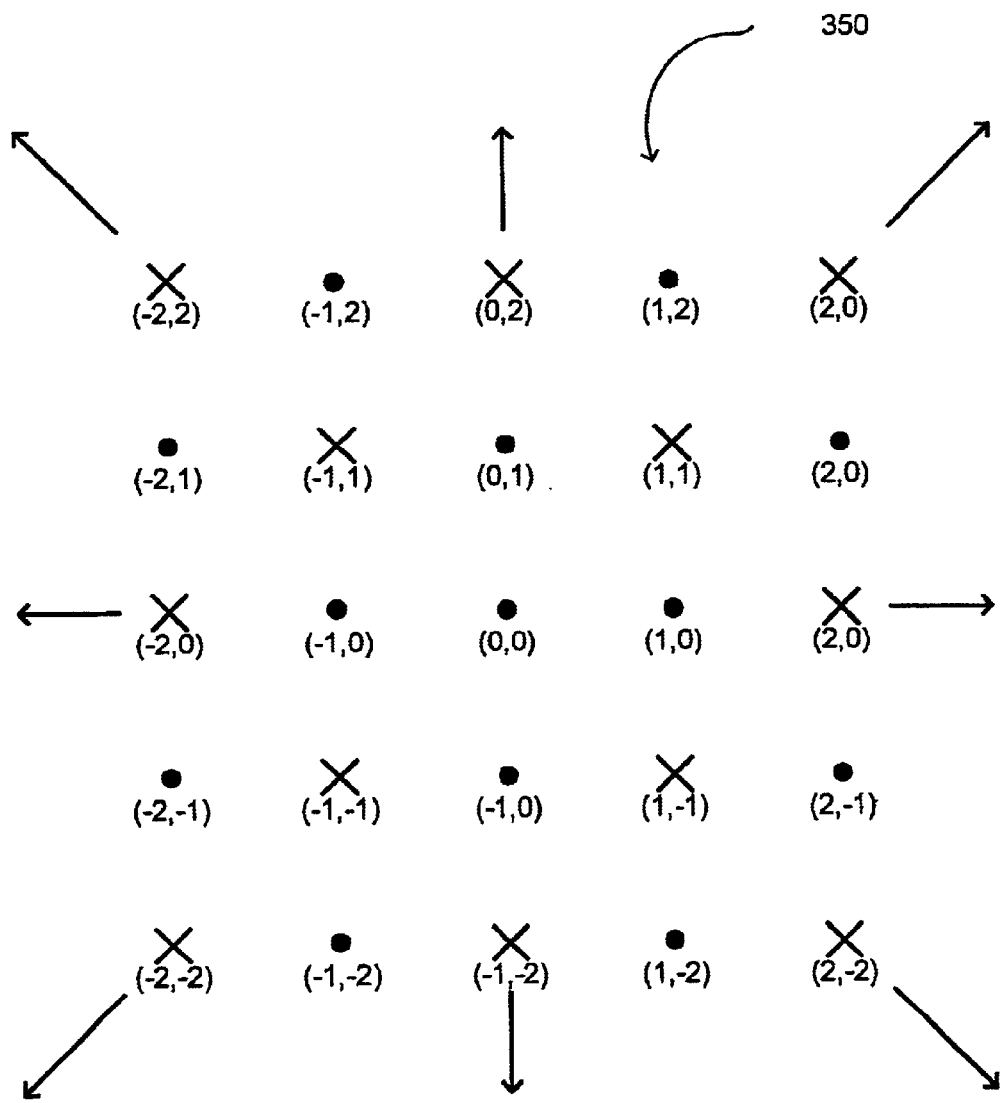
FIG. 2 is a schematic illustration of an optical grid.

Reference is now made to FIG. 2, which is a schematic illustration of an optical grid, generally referenced 350. Grid 350 is generally placed over the reference plane 110 (FIG. 1). Point (0,0) is the initial point from which the determination process begins. In the present example, the vertex of surface 100 is located on the ray which is originated at point (0,0).

Figure 3:
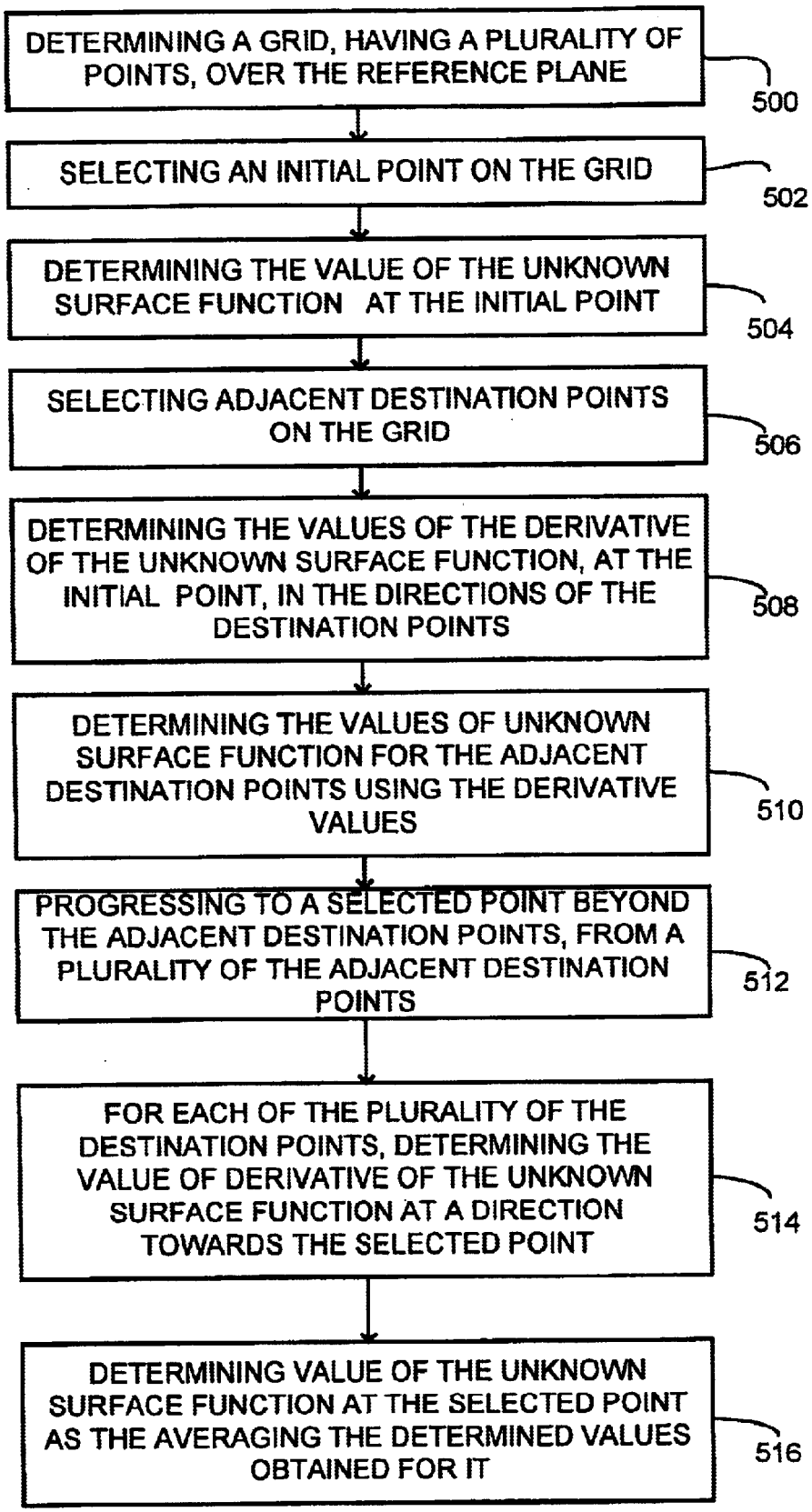
FIG. 3 is a schematic illustration of a method, operative in accordance with another embodiment of the present invention.

Reference is further made to FIG. 3, which is a schematic illustration of a method for determining an unknown optical surface, operative in accordance with another embodiment of the present invention.

In step 500, a grid is determined. The grid has a plurality of points, which are located over the reference plane. It is noted that the grid can be any type of grid, which is known in the art. In the present example, provided in FIG. 2, an orthogonal grid 350 is determined, over the reference plane 110 (FIG. 1).

In step 502, an initial point is selected, from which the process of determining the requested optical surface will commence. In the present example, point (0,0) denotes the initial point (FIG. 2).

In step 504, the value of the unknown surface function at that initial point is pre-determined. Accordingly, the value of the function at point (0,0) is pre-determined.

In step 506, adjacent destination points are selected on the grid. In the present example, the points (−1,0), (1,0), (0,−1) and (0,1) are selected.

In step 508, the values of the derivative of the unknown surface function, at the initial point, in the directions of the destination points are determined. In the present example, the values of the derivative of the surface function of surface 100 (FIG. 1) are determined at the point (0,0), in each of the directions of points (−1,0), (1,0), (0,−1) and (0,1). These derivative values are determined using Equation (4).

In step 510, using the derivative values which were determined in step 508, the values of the unknown function are determined for each of the selected adjacent destination points. In the present example, the values of the function of surface 100 (FIG. 1) which relate to points (−1,0), (1,0), (0,−1) and (0,1) are determined.

In step 512, the determination process progresses towards selected points, which are located beyond the adjacent points. This progression, towards a selected point, can be performed in more than one direction, yielding different values of the unknown surface function for that selected point. In the present example, the point (1,1) is selected. Point (1,1) is located near and beyond points (0,1) and (1,0).

In step 514, the value of derivative of the unknown surface function is determined for each of the plurality of the destination points, at a direction towards the selected point. In the present example, the value of the derivative of the surface function of surface 100 (FIG. 1) is determined for point (0,1) and (1,0), in the direction of point (1,1).

In step 516, the value of the unknown surface function is determined for the selected point, according to the values of the function (step 510) and its derivative (step 514) with respect to the plurality of the destination points. When some of the plurality of the destination points yield different values of the unknown surface for the selected point, then the final value of the unknown surface for the selected point, is determined as the average of these values.

In the present example, the value of the function of surface 100 for point (1,1) is determined using the values and derivatives of the function of surface 100, for points (1,0) and (0,1).

It is noted that the same process is performed for points (0,1) and (−1,0) with respect to point (−1,1), points (0,−1) and (−1,0) with respect to point (−1,−1), as well as for points (1,0) and (−1,0) with respect to point (1,−1).

When the compatibility condition does not hold, then no surface exists which exactly meets the requirements of the ray transfer. In this case the present invention provides a surface which provides an optimal solution for the requirements of the ray transmission, under a selected cost function.

Accordingly, Equation (4) is presented in a vector format $\nabla f - F(x,y,f) = 0$, where the vector $F=(F_1,F_2)$ is given by the right hand side of 4. The object of the invention at this stage is to determine the surface f, which minimizes $E(\nabla f - F(x,y,f))$, where E is a selected cost function. As an example we shall consider below the cost function $$E = \int (\nabla f - F(x,y,f))^2 dxdy. \quad (5)$$

It will be noted that several other cost functions are applicable for the present invention. For example, when the designer wants to emphasize certain areas in the surface, or the shape of the surface f itself, this can be accomplished by weighting the cost function through $$E = \int w(x,y,f,\nabla f)(\nabla f - F(x,y,f))^2 dxdy \quad (6)$$

where w(x,y,f,∇f) is a suitable weight function in this case.

The weight function can be a function which depends on many elements such as the position (x,y), the shape of the surface f, the gradient of the shape of the surface f and the like. For example, the dependency upon the gradient of the shape of f, is selected when the designer wants to emphasize the surface area of selected regions, within the determined surface.

Furthermore, other constraints can be applied on the solution of the optimization process. For example, the designer can force pre-specified values of f, such as the height of the surface, at pre-specified preferred points.

S. G. Michlin, "The Numerical Performance of Variational Methods", Wolters—Noordhoff, 1971, (Netherlands) and M. J. Forray, "Variational Calculus in Science and Engineering", McGraw-Hill, 1960, both describe the theory of calculus of variations. According to this theory, the minimization of E leads to a partial differential equation for the surface f. For example, under the choice of Equation (5) as a cost function, the following partial differential equation for the surface f is obtained.:

$$\nabla^2 f - \nabla \cdot F + F_f \nabla f - F \cdot F_f = 0. \tag{7}$$

The equation might be subjected to external conditions. For example, as stated above, the designer can provide values of f at selected points.

It will be appreciated that in practice, the projected light beam includes a finite number of rays. According to the present invention, this poses no difficulty since the equations can be solved by a discretization process.

In general, the problem of optimizing the cost function E can be solved according to a plurality of methods, as will be described herein below. One method is to directly minimize the cost function. Another method is to solve the associated partial differential equation.

D. H. Norris and G. de Vries, "The Finite Elements Method", Academic Press, 1973 describe the principles of the finite elements method. A. Iserles, "A First Course in Numerical Analysis of Differential Equations", Cambridge University Press, 1996 describes the finite difference method. S. G. Michlin, "The Numerical Performance of Variational Methods", Wolters—Noordhoff, 1971, (Netherlands), describes the Galerkin-Ritz method.

Each of these methods can be used to solve the problem of optimizing the cost function.

Figure 4:
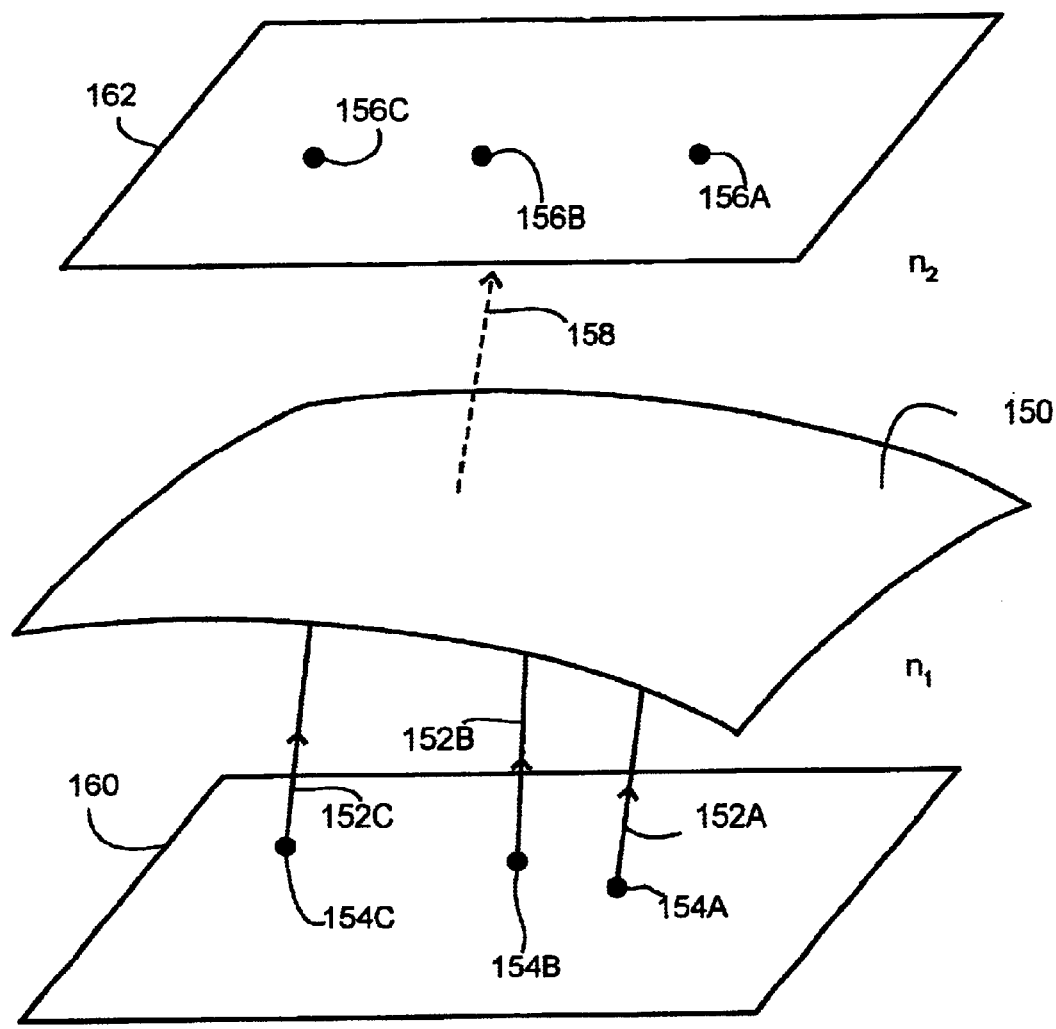
FIG. 4 is a schematic illustration of a refractive surface and a set of light rays, constructed and operative in accordance with another preferred embodiment of the present invention.

Reference is now made to FIG. 4, which is a schematic illustration of a refractive surface, generally referenced 150 and a set of light rays, constructed and operative in accordance with another preferred embodiment of the present invention.

Light rays 152A, 152B and 152C, originate from points 154A, 154B and 154C, respectively, which are located on a reference plane 160. The light rays 152A, 152B and 152C are directed towards the refracting surface 150. The surface 150 refracts the rays 152A, 152B and 152C, which are detected at points 156A, 156B and 156C, respectively. Points 156A, 156B and 156C are located on a surface 162. Arrow 158 denotes the normal vector to the surface 150. It is noted that in the present example, surface 162 is a plane, although, according to the present invention, it can be any type of surface.

According to the present invention, the designer can provide the locations 154 and directions 152 of the rays on one side of f and the locations of the points 156 on the other side of the refracting surface, through which the ray passes. Alternatively, this information can also be provided by a measuring device.

For a ray which is emitted from location (x,y) on the reference plane 160 in the region with an index of refraction $n_1$, the location of that ray on surface 162, in the region with refraction index $n_2$, is denoted by $(\xi(x,y),\eta(x,y),h(x,y))$. Then, by the same mathematical arguments that led to Equation (3), an equation of the form of Equation (4) can be obtained, with $u_1$ and $u_2$ replaced by $$u_1 = f_{x0} = \frac{n_2 \Delta x - n_1 D \cos\phi \cos\theta}{n_1 D \sin\theta - n_2 \Delta z}, \tag{8}$$

$$u_2 = f_{y0} = \frac{n_2 \Delta y - n_1 D \sin\phi \sin\theta}{n_1 D \sin\theta - n_2 \Delta z}$$

where $\Delta x = \xi - (x + f \cos\phi \cot\theta)$, $\Delta y = \eta - (y + f \sin\phi \cot\theta)$, $\Delta z = h - f$ and $D = \sqrt{\Delta x^2 + \Delta y^2 + \Delta z^2}$.

Equation (4) is now valid with the new formula for $(u_1, u_2)$. It will be noted that the above discussion concerning the solvability of (4) and the search for an optimal surface using a cost function E applies to this case as well.

Accordingly, the present invention provides a method which provides the topography of a surface of an optical element, from information relating to the refraction of rays by the refracting element. This information includes the direction and location of a plurality of rays before interacting with the optical element as well as the direction (as in FIG. 1) or the location (as in FIG. 4) of their respective refracted rays. Alternatively, this information can include the direction or the location of a plurality of rays before interacting with the optical element as well as the location and the direction of their respective refracted rays. The case of the information including the direction of the rays before interacting with the optical element can be visualized by reversing the direction of the rays in FIG. 1. The calculations use Equation (4), where the variables are redefined as follows:

(x,y) denotes the geometrical location of each refracted ray, on a reference plane;

$n_1$ denotes the optical index with respect to the refracted rays;

$n_2$ denotes the optical index with respect to the rays before interacting with the optical element;

f denotes the height of the optical surface above the reference plane;

(cos φ cos θ, sin φ cos θ, sin θ) denotes the direction vector of the each of the refracted rays; and (a,b,c) denotes the direction vector of each of the rays before interacting with the optical element.

The case of the information including the location of the rays before interacting with the optical element can be visualized by reversing the direction of the rays in FIG. 4. The calculations use Equation (4), with $u_1$ and $u_2$ defined as in Equation (8), where the variables are redefined as follows:

(ξ(x,y),η(x,y),h(x,y)) denotes the geometrical location of each ray before interacting with the optical element;

(x,y) denotes the geometrical location of each refracted ray on a reference plane;

$n_1$ denotes the optical index with respect to the refracted rays;

$n_2$ denotes the optical index with respect to the rays before interacting with the optical element;

f denotes the height of the optical surface above the reference plane; and (cos φ cos θ, sin φ cos θ, sin θ) denotes the direction vector of the each of the refracted rays.

The present invention also provides a method for constructing optimal reflective surfaces. This aspect of the invention is easily provided using the above equations, by replacing the refraction index $n_2$ with a refractive index which is equal to $-n_1$.

The present invention provides a method for determining optimal refractive or reflective surfaces, or reconstruction of such surfaces from given measurements. According to one aspect of the invention, the directions and locations of the rays on both sides of the surface are provided. In this case the method provides a step of ray tracing, wherein the path of each ray is traced on both side of the surface, in opposite directions, towards an intersection point. Finally, the collection of intersection points is utilized to define a surface g.

It will be appreciated that errors in the actual measurements or outstanding designing requirements can inflict on the accuracy or solvability of the equations, up to the point that the surface g determined by ray-tracing does not meet the requirements as set forth by conventional optical equations of refraction or reflection.

If the surface g does not refract (or reflect) the rays according to Equation (2), then there is no surface that exactly meets the requirements of the data. In this case the present invention provides a method for determining the unknown surface f by optimizing a cost function of the form $E(\nabla f - F(x,y,f), f, g)$.

With reference to the above Equation (5), we obtain, for example $$E = \int (\nabla f - F(x,y,f))^2 + a(x,y)(f-g)^2 dxdy, \quad (9)$$

or more generally $$E = \int (w(\nabla f - F(x,y,f))^2 + a(f-g)^2)) dxdy. \quad (10)$$

where the functions $a(x,y,f,\nabla f)$ and $w(x,y,f,\nabla f)$ are weight functions that can be adjusted by the user.

According to a further aspect of the present invention, the designer can impose an initial surface g to which a finally determined surface f has to conform. This situation is similar to the one described above in conjunction with Equations (9) and (10) and hence can be solved in a similar manner.

Figure 5:
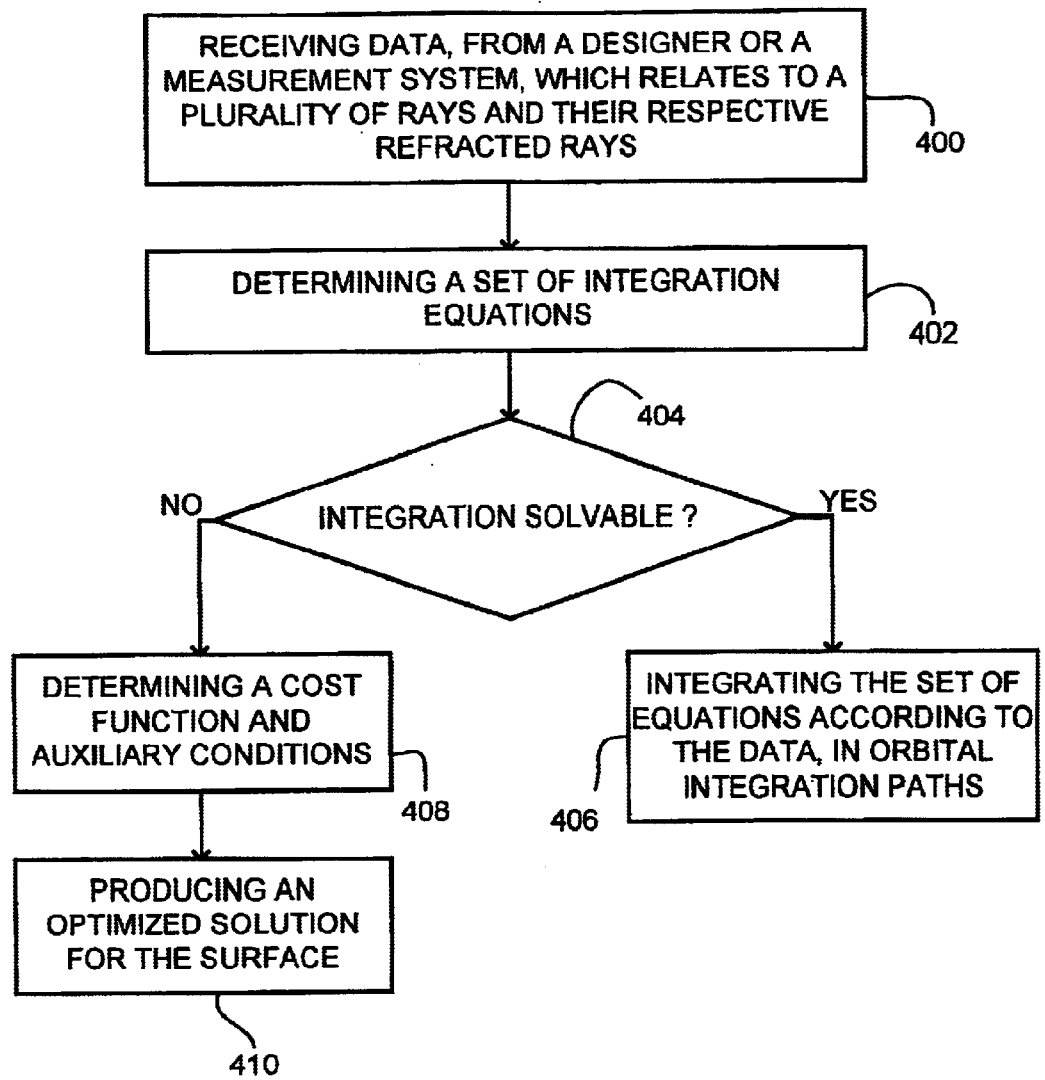
FIG. 5 is a schematic illustration of a method, operative in accordance with a further embodiment of the present invention.

Reference is now made to FIG. 5, which is a schematic illustration of a method for determining an unknown optical surface, operative in accordance with a further aspect of the present invention.

In step 400, data is received from a designer or a measurement system. This data relates to a plurality of rays and their respective refracted rays. In the example, shown in FIG. 1, this data includes the geometry characteristics of rays 102 and the directions of their respective refracted rays 106. In the example, shown in FIG. 4, this data includes the geometry characteristics of rays 152 and the locations of their respective refracted rays 156, on surface 162.

In step 402, a set of integration equations is determined from the data, with respect to the requested surface. The above Equations (4), denote such integration equations.

In step 404, the integration equations are checked whether they can be solved. If so, then we proceed to step 406. Otherwise, we proceed to step 408.

In step 406, the integration equations are integrated according to the received data, thereby producing the requested function of the optical surface. For example, these equations can be integrated according to the integration paths method shown in conjunction with FIGS. 2 and 3.

In step 408, a cost function and auxiliary conditions are determined, such as cost function E (For example, see Equation (6)).

In step 410, an optimized solution is produced for the function of the requested surface.

The embodiments presented above addressed the construction of a single surface of an optical element, where any other surface within the optical element is known, a prori.

The present invention further provides a method for determining one surface f of an optical element having another known surface g. It is noted that the determined surface f can be on either side of the optical element, with respect to the origin of the refracted rays.

Figure 6:
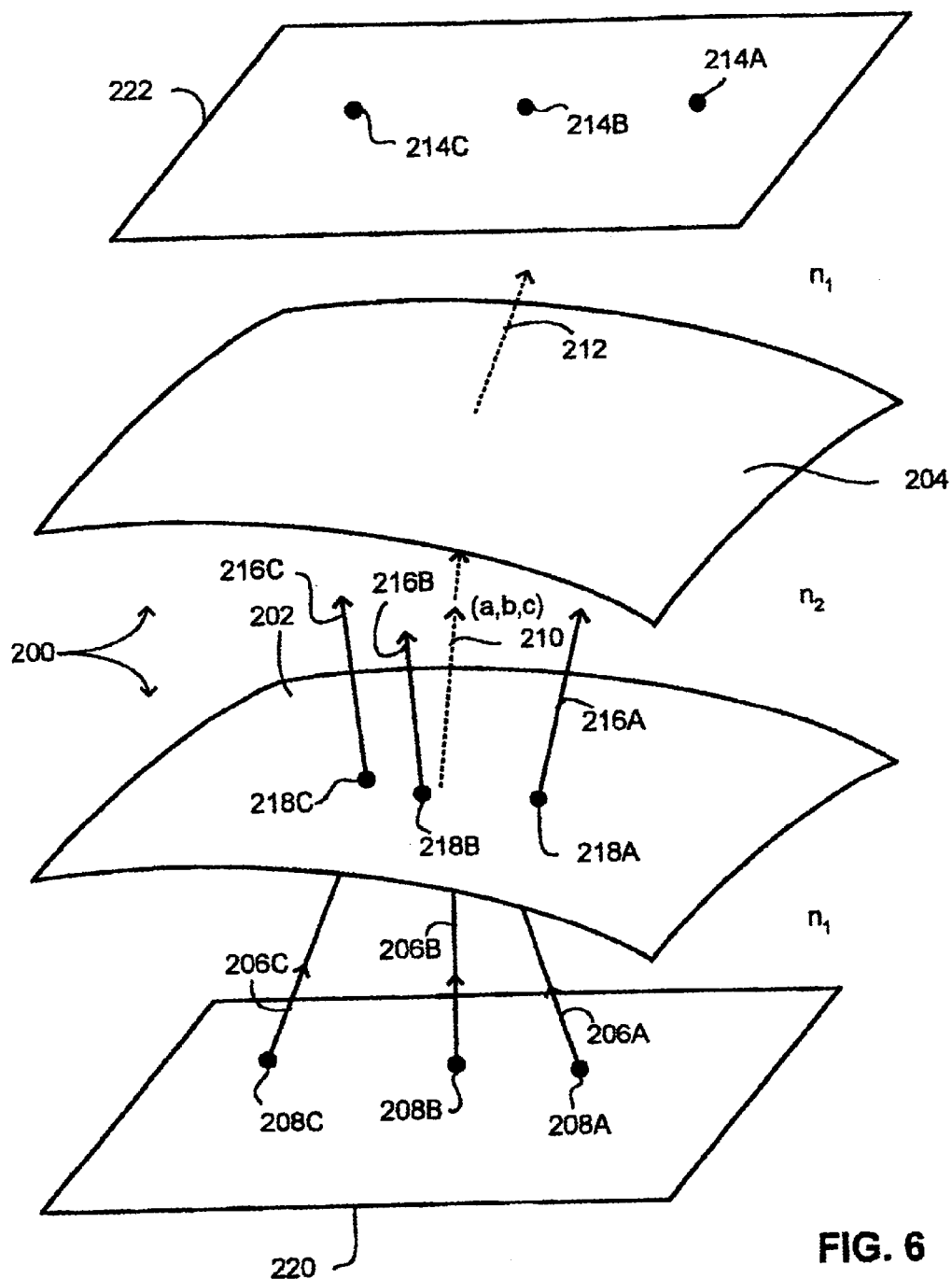
FIG. 6 is a schematic illustration of a refractive optical element and a set of light rays, constructed and operative in accordance with a further preferred embodiment of the present invention.

Reference is now made to FIG. 6, which is a schematic illustration of a refractive optical element, generally referenced 200 and a plurality of light rays, constructed and operative in accordance with a further preferred embodiment of the present invention.

Optical element 200 has two refracting surfaces 202 and 204. In the case where surface 204 is known and surface 202 is to be determined, then surface 202 and 204 are associated with function f and g, respectively. Arrows 210 and 212 denote the normal vectors to surface 202 and 204, respectively.

A plurality of light rays 206A, 206B and 206C are originated at points 208A, 208B and 208C, which are positioned on plane 220 and are directed towards surface 202.

After being refracted by optical element 200, light rays 206A, 206B and 206C are detected or defined by the user, at the final destination points 214A, 214B and 214C, respectively. Points 214A, 214B and 214C are located on a surface 222.

Figure 7:
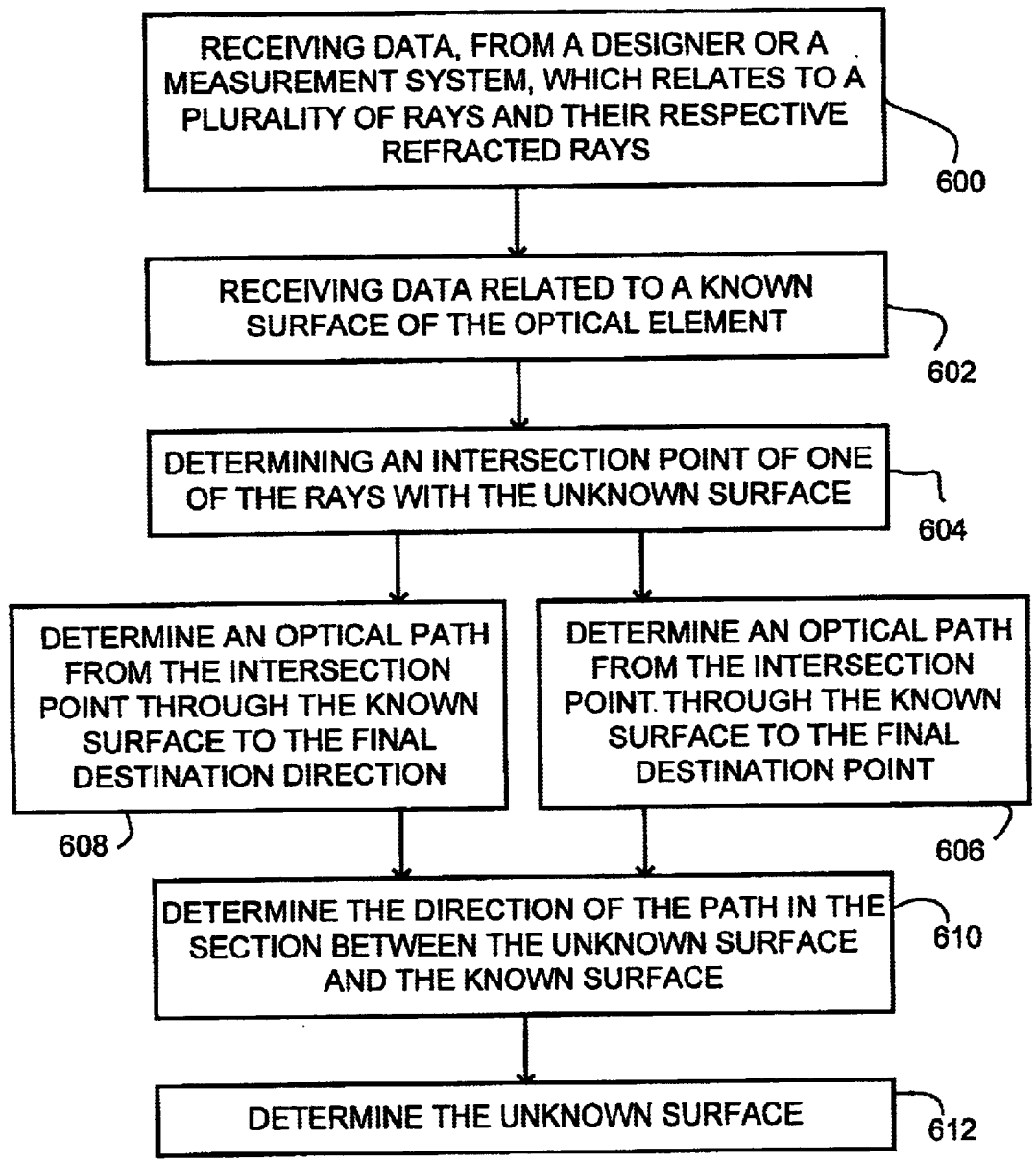
FIG. 7 is a schematic illustration of a method for determining the unknown optical surface of FIG. 6, operative in accordance with another preferred embodiment of the invention.

Reference is now made to FIG. 7, which is a schematic illustration of a method for determining the unknown optical surface of FIG. 6, operative in accordance with another preferred embodiment of the invention.

Initially, the data which relates to the rays 206A, 206B and 206C to be refracted by the optical element, are received, either from the designer or from a measurement system (step 600). This data includes the locations and direction of each of the rays. Furthermore, the user provides data relating to the geometry of the known surface g, which in the present example, is surface 204 (step 602).

Then, an intersection point between each of the rays 206 and the unknown surface 202 is determined (step 604). In the present example, intersection points 218A, 218B and 218C are determined respective of rays 206A, 206B and 206C.

In step 606, an optical path from each of the intersection points 218, through the known surface 204 towards the final destination points 214, is determined. This path can be determined according to a selected physical criterion, such as the Fermat principle of minimal travel time.

In step 610, the direction of the path in the section between the unknown surface f and the known g is determined. In the present example, the direction of each of refracted rays 216A, 216B and 216C, is determined. (Step 608 addresses a case where the final destination direction is known, which will be described herein below in conjunction with FIG. 8).

Finally, the unknown surface f is determined according to the information which was received and obtained herein above, according to the method of FIG. 5 (step 612).

In the case where surface 202 is known and surface 204 is to be determined, then surface 202 and 204 are associated with function g and f, respectively.

This case is simpler than the case where surface 202 is unknown and surface 204 is known. In this case, refracted rays 216A, 216B and 216C are determined from the data which relates to the known surface 202 and the rays 206A, 206B and 206C. Then, the unknown surface 204 is determined according to the method set forth in conjunction with FIG. 5.

Figure 8:
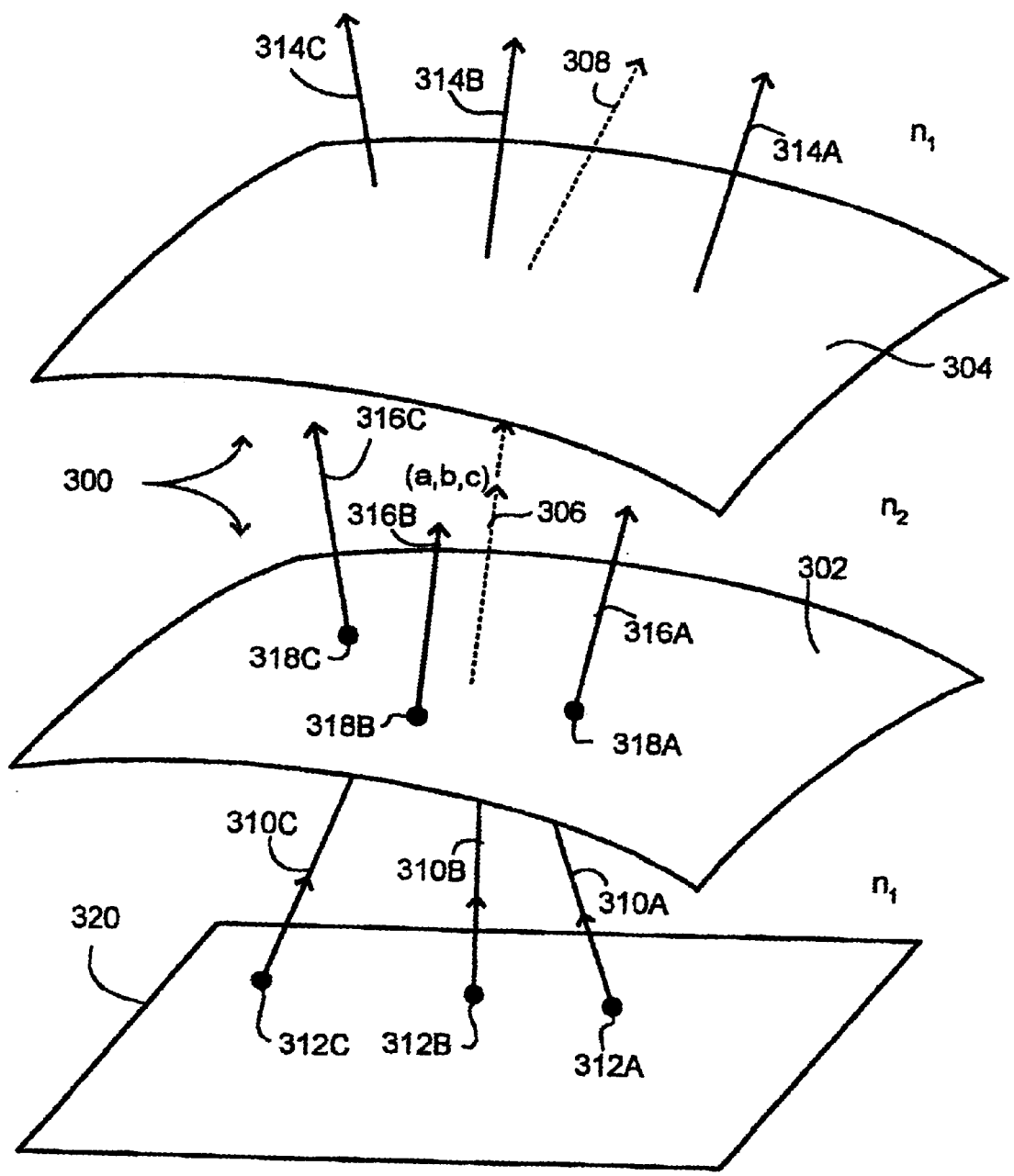
FIG. 8 is a schematic illustration of a refractive optical element and a set of light rays, constructed and operative in accordance with a further preferred embodiment of the present invention.

Reference is now made to FIG. 8, which is a schematic illustration of a refractive optical element, generally referenced 300 and a plurality of light rays, constructed and operative in accordance with a further preferred embodiment of the present invention.

Optical element 300 has two refracting surfaces 302 and 304. In the case where surface 304 is known and surface 302 is to be determined, then surface 302 and 304 are associated with functions f and g, respectively. Arrows 306 and 308 denote the normal vectors to surface 302 and 304, respectively.

A plurality of light rays 310A, 310B and 310C are originated at points 312A, 312B and 312C, which are positioned on plane 320 and are directed towards surface 302.

After being refracted by optical element 300, light rays 310A, 310B and 310C are detected or defined by the user, in the final destination directions 314A, 314B and 314C, respectively.

Basically, surface 302 can be determined according to the method set forth in FIG. 7, with the modification of performing step 608 instead of step 606. In step 608, an optical path from each of the intersection points 318, through the known surface 304 towards the final destination directions 314, is determined. Similarly, this path can be determined according to a selected physical criterion, such as the Fermat principle of minimal travel time.

In the case where surface 302 is known and surface 304 is to be determined, then surface 302 and 304 are associated with function g and f, respectively.

This case is simpler than the case where surface 302 is unknown and surface 304 is known. In this case, refracted rays 316A, 316B and 316C are determined from the data which relates to the known surface 302 and the rays 310A, 310B and 310C. Then, the unknown surface 304 is determined according to the method set forth in conjunction with FIG. 5.

According to one aspect of the invention, a method is provided for simultaneously determining two refractive surfaces of an optical element from measurements on rays passing through them. The same method can be used when one or both of the surfaces to be determined are reflective, by replacing the refractive index with the negative of the neighboring refractive index, but only the case of two refractive surfaces will be described hereinbelow.

According to another aspect of the invention, a method is provided for simultaneously designing two refractive surfaces of an optical element, in such a way that the surfaces will optimally transmit a beam of rays in a desired fashion.

The method of the present invention is particularly suitable (but not limited) to the design of progressive multifocal lenses.

Figure 9A:
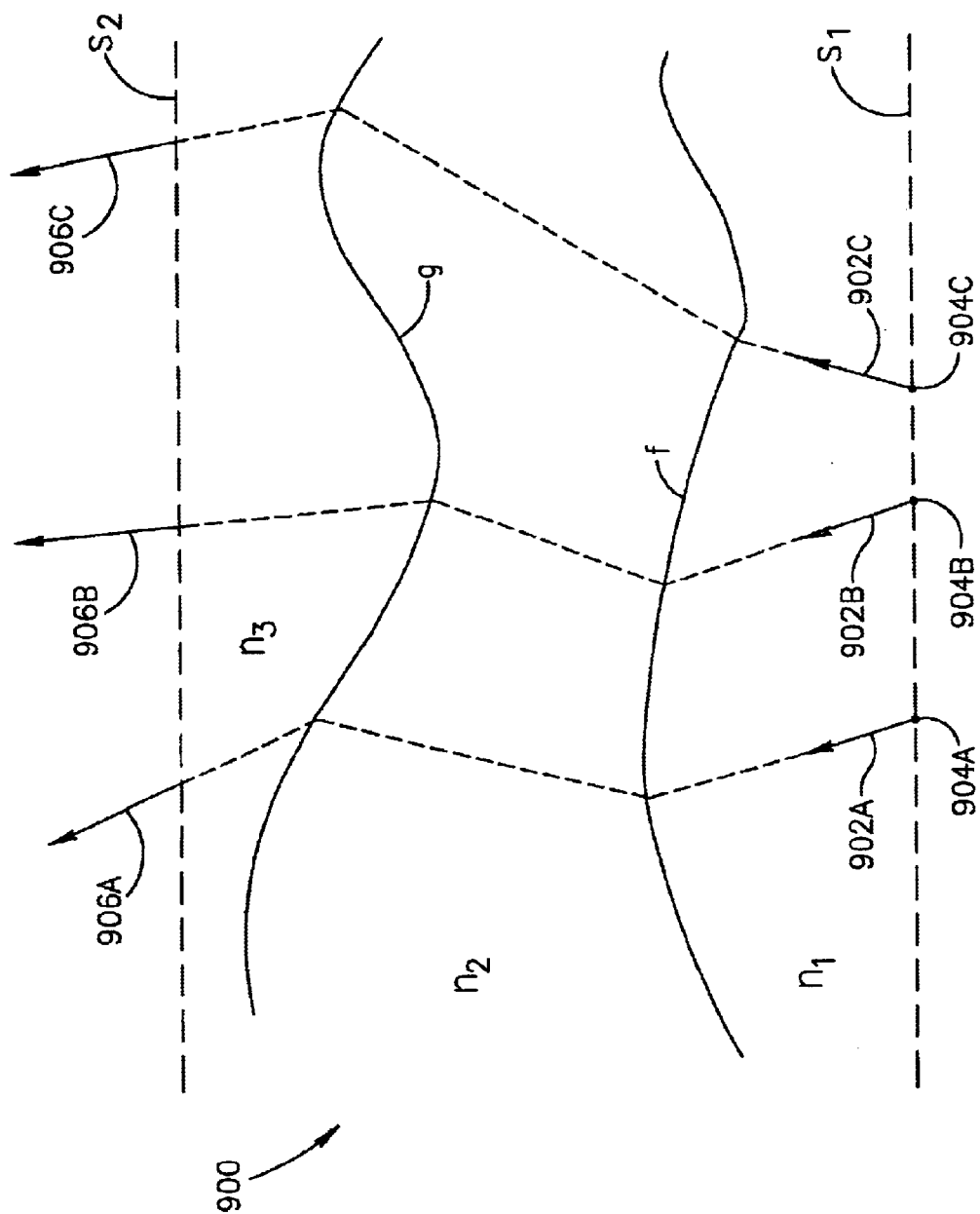
FIGS. 9A and 9B are schematic illustrations of a set of light rays and an optical element having two refractive surfaces.

Reference is now made to FIG. 9A, which is a schematic illustration of a set of light rays and an optical element, for example a lens 900 having two refractive surfaces, referenced f and g, respectively. The surfaces f and g divide the space into three parts: below the lens 900, the index of refraction is $n_1$; inside the lens 900, between the surfaces f and g, the index of refraction is $n_2$; above the lens 900, the index of refraction is $n_3$. A beam of rays is transmitted through the lens 900. Light rays 902A, 902B and 902C originating from points 904A, 904B and 904C, respectively, are directed towards surface f. At surface f, they are refracted, and then at surface g, refracted once again into rays 906A, 906B and 906C, respectively.

The geometric location and direction of each ray is known on both sides of the lens 900, either from measurements, or from the specifications of the lens designer. The goal is to determine the surfaces f and g from the geometry of the rays.

Several methods for determining the geometric location and direction of the rays on both sides of the lens 900 are known in the art. Three non-limiting example of an optical system for creating and measuring incident rays will now be described. In the first example, a parallel beam is projected onto the lens 900 through an opaque screen $S_1$ with tiny holes 904A, 904B and 904C in order to create the incident rays 902A, 902B and 902C. In the second example, the screen $S_1$ is a transparent screen with tiny opaque dots 904A, 904B and 904C. In the third example, the screen $S_1$ is a transparent screen with a grid, the points of intersection of which are the tiny opaque dots 904A, 904B and 904C. A non-limiting example of an optical system for measuring affected rays will now be described. The refracted rays 906A, 906B and 906C can project on a screen $S_2$ on the other side of the lens 900, and detected with a common camera. By shifting the screen $S_2$ to additional positions closer to or further away from the lens 900, several points along each of the refracted rays 906A, 906B and 906C can be obtained, from which the directions of these rays can be determined.

Alternatively, if the goal is to design the optimal refracting surfaces f and g according to particular specifications, the designer prescribes the geometric locations and directions of the rays. In some cases, as will be described in greater detail hereinbelow, the designer can choose to prescribe the geometric description of the rays only partially.

For the sake of clarity, FIG. 9A shows only three rays. However, it will be appreciated that in general, a large number of rays will be used to determine or design the lens.

Figure 9B:
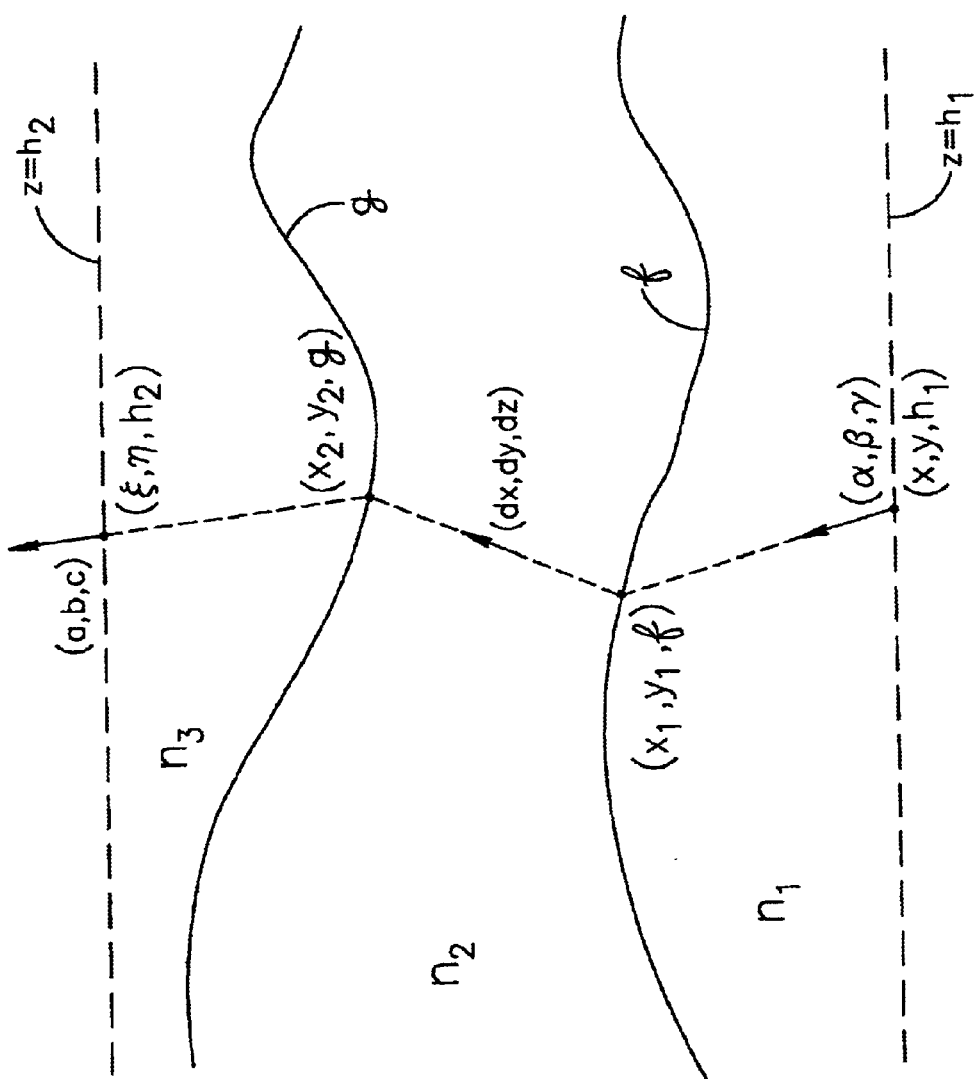

Reference is now made additionally to FIG. 9B, which is a schematic illustration of the same two refractive surfaces of FIG. 9A. FIG. 9B shows the geometrical descriptions of the surfaces and the rays. It will be appreciated by those skilled in the art that the geometrical definition of rays 902A, 902B and 902C can be provided in a plurality of formats known in the art. Hence, it is noted that a reference surface below the lens 900, such as an x-y plane given by $z=h_1$, can be determined. Furthermore, the position (x,y) and unit direction vector ($\alpha(x,y)$, $\beta(x,y)$, $\gamma(x,y)$) of each ray on the reference plane $z=h_1$ can be determined. Similarly, from the geometrical definition of rays 906A, 906B and 906C, a reference surface above the lens, such as an x-y plane given by $z=h_2$, can be determined, as well as the position ($\xi(x,y)$, $\eta(x,y)$) and unit direction vector (a(x,y), b(x,y), c(x,y)) of each ray on the reference plane $z=h_2$. It will be appreciated that the use of a reference plane with respect to the description provided herewith is not restricted to common flat planes, but rather any type of surface can be used for this purpose.

A function f is used to represent the surface f, and a function g is used to represent the surface g. A ray originating from (x,y) intersects the surface f at the point ($x_1,y_1$, f), where $x_1$ and $y_1$ are given in Equations (11):

$$x_1 = x + \frac{\alpha}{\gamma}(f - h_1) \qquad (11)$$

$$y_1 = y + \frac{\beta}{\gamma}(f - h_1).$$

Similarly, the same ray intersects the surface g at the point ($x_2,y_2,g$), where $x_2$ and $y_2$ are given in Equations (12):

$$x_2 = \xi + \frac{a}{c}(g - h_2) \tag{12}$$

$$y_2 = \eta + \frac{b}{c}(g - h_2).$$

It is convenient to express the unit direction vector of the ray inside the lens as $$(dx, dy, dz) = \frac{1}{D}(Dx, Dy, Dz),$$

where Dx, Dy, Dz and D are given in $$Dx = \xi - x + \frac{a}{c}(g - h_2) - \frac{\alpha}{\gamma}(f - h_1) \tag{13}$$

$$Dy = \eta - y + \frac{b}{c}(g - h_2) - \frac{\beta}{\gamma}(f - h_1)$$

$$Dz = g - f \quad \text{and}$$

$$D = \sqrt{Dx^2 + Dy^2 + Dz^2}.$$

The law of refraction at the surface f leads to the following set of Equations (14) for the normal vector to f at $(x_1, y_1, f)$:

$$n_2 dz - n_1 \gamma = s$$

$$n_2 dy - n_1 \beta = -s f_{y_1}$$

$$n_2 dx - n_1 \alpha = -s f_{x_1}, \tag{14}$$

where $f_{x_1}$ and $f_{y_1}$ are the partial derivatives of f with respect to $x_1$ and $y_1$. When the proportionality constant s is eliminated, the set of Equations (14) become the following Equations (15) at $(x_1, y_1, f)$:

$$f_{x_1} = \frac{n_2 dx - n_1 \alpha}{n_1 \gamma - n_2 dz} \equiv u_1 \tag{15}$$

$$f_{y_1} = \frac{n_2 dy - n_1 \beta}{n_1 \gamma - n_2 dz} \equiv u_2.$$

Similarly, the refraction equations at the surface g lead to the following set of Equations (16) at the point $(x_2, y_2, g)$:

$$g_{x_2} = \frac{n_2 dx - n_3 \alpha}{n_3 c - n_2 dz} \equiv v_1 \tag{16}$$

$$g_{y_2} = \frac{n_2 dy - n_3 b}{n_3 c - n_2 dz} \equiv v_2.$$

where $g_{x_2}$ and $g_{y_2}$ are the partial derivatives of g with respect to $x_2$ and $y_2$. Using the chain rule of differentiation, the system of Equations (15) and (16) can be expressed in terms of the variables (x,y) that define the ray on the plane $z=h_1$. Using Equations (11), (12), (15) and (16), the following set of partial differential Equations (17) at (x,y) is obtained:

$$f_x = \frac{u_1 + (f - h_1)[u_1(\alpha/\gamma)_x + u_2(\beta/\gamma)_x]}{1 - (u_1 \alpha/\gamma + u_2 \beta/\gamma)} \equiv e1 \tag{17}$$

$$f_y = \frac{u_2 + (f - h_1)[u_1(\alpha/\gamma)_y + u_2(\beta/\gamma)_y]}{1 - (u_1 \alpha/\gamma + u_2 \beta/\gamma)} \equiv e2 \quad \text{and}$$

-continued $$g_x = \frac{v_1 \xi_x + v_2 \eta_x + (g - h_2)[v_1(a/c)_x + v_2(b/c)_x]}{1 - (v_1 a/c + v_2 b/c)} \equiv e3$$

$$g_y = \frac{v_1 \xi_y + v_2 \eta_y + (g - h_2)[v_1(a/c)_y + v_2(b/c)_y]}{1 - (v_1 a/c + v_2 b/c)} \equiv e4.$$

Notice that in general, the functions ei, i=1,2,3,4, are functions of unknown functions f and g, and known variables x, y, α(x,y), β(x,y), γ(x,y), ξ(x,y), η(x,y), a(x,y), b(x,y) and c(x,y). This fact can be expressed in the following Equation (18):

$$ei = ei(f, g; x, y, \alpha, \beta, \gamma, \xi, \eta, a, b, c), \; i=1,2,3,4, \tag{18}$$

where the variables before the semicolon are unknown, and the variables after the semicolon are known. Therefore the system of Equations (17) is solvable only under the compatibility conditions $$e1_y = e2_x,$$

$$e3_y = e4_x. \tag{19}$$

If the compatibility conditions (19) hold simultaneously, the system of Equations (17) has infinitely many solutions. Additional conditions must be imposed in order to fix a particular solution. For example, the values $f(x_0, y_0)$ and $g(x_0, y_0)$ of the intersection of the ray originating at a particular point $(x_0, y_0)$ on the reference plane $z=h_1$ can be given. In this case, there are many methods for integrating Equations (17).

One such method, integration by many orbits, is described above with respect to FIGS. 2 and 3.

When the compatibility conditions 19 do not hold, then there are no surfaces f and g that exactly meet the requirements of the ray transfer. In this case, the lens is designed to optimally meet an additional requirement. For this purpose, a cost function $E=E(f, g, \nabla f, \nabla g; x, y, \alpha, \beta, \gamma, \xi, \eta, a, b, c)$ is introduced and minimized. As described above, the minimization is over the unknown functions f and g, while the functions α(x,y), β(x,y), γ(x,y), ξ(x,y), η(x,y), a(x,y), b(x,y) and c(x,y) are given a prori. For example, the cost function E given in Equation (20), $$E = \int [(f_x - e1)^2 + (f_y - e2)^2 + (g_x - e3)^2 + (g_y - e4)^2] dx dy, \tag{20}$$

could be used. Alternatively, the cost function E given in Equation (21), $$E = \int [w_1(f_x - e1)^2 + w_2(f_y - e2)^2 + w_3(g_x - e3)^2 + w_4(g_y - e4)^2] dx dy, \tag{21}$$

could be used, in which $w_i(x, y, f, g, \nabla f, \nabla g)$, i=1,2,3,4, are weight functions that enable the designer to emphasize certain aspects in the optimization process, such as specific areas in the lens.

The optimization of the cost function can be performed by a variety of well-known methods, such as the method of finite elements, the method of finite differences, the Galerkin-Ritz method, etc. Furthermore, auxiliary constraints on the unknown functions f and g, such as the values of the functions at specific points, can be imposed.

As mentioned hereinabove, the designer can choose to prescribe the geometric description of the rays only partially. Converting some of the ray parameters α(x,y), β(x,y), γ(x,y), ξ(x,y), η(x,y), a(x,y), b(x,y) and c(x,y) from known to unknown, effectively reduces the number of constraints and adds more degrees of freedom to the optimization process. For example, if the direction vector (a(x,y), b(x,y), c(x,y)) of the refracted ray is not prescribed, then the cost function is expressed as $E=E(f,g,\nabla f,\nabla g,a,b,c;x,y,\alpha,\beta,\gamma,\xi,\eta)$, and the optimization is over the unknown functions f, g, a, b and c. It will be appreciated that some of the free parameters can be related to one another. In the example above, the relation $a^2+b^2+c^2=1$ holds. This does not pose a difficulty, since the relations can be maintained during the optimization process by well known techniques such as the Lagrange multiplier method or projection methods.

The methods of the present invention are equally applicable to an optical element having two unknown refractive surfaces and at least one known refractive surface. An example of an optical element having more than two refractive surfaces is a camera comprising several lenses. The unknown surfaces are determined or designed by the methods of the present invention. Either the unknown surfaces are adjacent, or at least one of the known surfaces is located between the unknown surfaces.

If the unknown surfaces are adjacent and one or more of the known surfaces ("lower known surfaces") is located between the unknown surfaces and the reference plane $z=h_1$, then the incident rays are refracted by the lower known surfaces before being refracted by the unknown surfaces. Using the geometrical description of the rays and the lower known surfaces, the incident rays may be ray-traced through the lower known surfaces to determine the geometrical description of the rays at a new reference plane $z=h'_1$ located between the lower known surfaces and the unknown surfaces. After expressing the integration equations in terms of the geometrical description of the rays with respect to the new reference plane, the methods described hereinabove are used to determine or design the unknown surfaces.

Similarly, if the unknown surfaces are adjacent and one or more of the known surfaces ("upper known surfaces") is located between the unknown surfaces and the reference plane $z=h_2$, then the refracted rays are refracted by the upper known surfaces after being refracted by the unknown surfaces. Using ray tracing and expressing the integration equations in terms of a new reference plane $z=h'_2$ located between the upper known surfaces and the unknown surfaces, the unknown surfaces are determined or designed using the methods described hereinabove.

If, however, one or more of the known surfaces ("middle known surfaces") are located between the two unknown surfaces, then for each ray incident upon one of the unknown surfaces, an optical path through the middle known surfaces towards the other unknown surface is determined. This path is determined according to a selected physical criterion, such as the Fermat principle of minimal travel time. The integration equations are then developed using the directions of the rays as determined from the optical path, and the methods described hereinabove are used to determine or design the unknown surfaces.

It will be appreciated by persons skilled in the art that the present invention is not limited to what has been particularly shown and described hereinabove. Rather the scope of the present invention is defined by the claims which follow.

The invention claimed is:

1. A method comprising:
   determining the topography of one or more unknown surfaces of an optical element, at least one of said unknown surfaces being non-spherical and non-planar, from a set of equations, said equations relating a) the optical index or indices of said optical element, b) said surfaces and first derivatives of said surfaces, and c) geometrical properties of a plurality of rays incident upon said optical element and of a corresponding plurality of rays affected by at least said unknown surfaces.

2. A method according to claim 1, wherein said affected rays are refracted by at least one of said unknown surfaces.

3. A method according to claim 1, wherein said affected rays are reflected by at least one of said unknown surfaces.

4. A method according to claim 1, further comprising measuring said geometrical properties.

5. A method according to claim 1, further comprising prescribing said geometrical properties.

6. A method comprising:
   determining the topography of one or more unknown surfaces of an optical element from a set of equations, said equations relating a) the optical index or indices of said optical element, b) said surfaces and first derivatives of said surfaces, and c) geometrical properties of a plurality of rays incident upon said optical element and of a corresponding plurality of rays affected by at least said unknown surfaces,
   wherein determining the topography of said unknown surfaces comprises:
   detecting whether said set of equations is solvable;
   when said set of equations is solvable, integrating said set of equations, thereby determining the topography of said unknown surfaces; and
   when said set of equations is not solvable:
      using said set of equations to determine a cost function; and
      optimizing said cost function subject to a set of predetermined auxiliary conditions, thereby determining the topography of said unknown surfaces.

7. A method comprising:
   determining the topography of two unknown surfaces of an optical element, at least one of said two unknown surfaces being non-spherical and non-planar, from a set of equations, said equations relating a) the optical index or indices of said optical element, b) said surfaces and first derivatives of said surfaces, and c) locations and directions of a plurality of rays incident upon said optical element and of a corresponding plurality of rays affected by at least said two unknown surfaces.

8. A method according to claim 7, further comprising measuring said locations and directions.

9. A method according to claim 7, further comprising prescribing said locations and directions.

10. A method according to claim 7, wherein said affected rays are refracted by at least one of said two unknown surfaces.

11. A method according to claim 7, wherein said affected rays are reflected by at least one of said two unknown surfaces.

12. A method comprising:
    determining the topography of two unknown surfaces of an optical element from a set of equations, said equations relating a) the optical index or indices of said optical element, b) said surfaces and first derivatives of said surfaces, and c) locations and directions of a plurality of rays incident upon said optical element and of a corresponding plurality of rays affected by at least said unknown surfaces,
    wherein determining the topography of said two unknown surfaces comprises:
    a detecting whether said set of equations is solvable;
    when said set of equations is solvable, integrating said set of equations, thereby determining the topography of said two unknown surfaces; and
    when said set of equations is not solvable:
       using said set of equations to determine a cost function; and optimizing said cost function subject to a set of predetermined auxiliary conditions, thereby determining the topography of said two unknown surfaces.

13. The method according to claim 12, the method further comprising the step of determining a first reference plane from said locations and directions, wherein said equations include $$f_x = \frac{u_1 + (f - h_1)[u_1(\alpha/\gamma)_x + u_2(\beta/\gamma)_x]}{1 - (u_1\alpha/\gamma + u_2\beta/\gamma)} \equiv e1$$

$$f_y = \frac{u_2 + (f - h_1)[u_1(\alpha/\gamma)_y + u_2(\beta/\gamma)_y]}{1 - (u_1\alpha/\gamma + u_2\beta/\gamma)} \equiv e2$$

$$g_x = \frac{v_1\xi_x + v_2\eta_x + (g - h_2)[v_1(a/c)_x + v_2(b/c)_x]}{1 - (v_1a/c + v_2b/c)} \equiv e3$$

$$g_y = \frac{v_1\xi_y + v_2\eta_y + (g - h_2)[v_1(a/c)_y + v_2(b/c)_y]}{1 - (v_1a/c + v_2b/c)} \equiv e4.$$

wherein $$u_1 = \frac{n_2 dx - n_1\alpha}{n_1\gamma - n_2 dz}, \quad u_2 = \frac{n_2 dy - n_1\beta}{n_1\gamma - n_2 dz}, \quad v_1 = \frac{n_2 dx - n_3 a}{n_3 c - n_2 dz}, \quad \text{and}$$

$$v_2 = \frac{n_2 dy - n_3 b}{n_3 c - n_2 dz};$$

$$(dx, dy, dz) = \frac{1}{D}(Dx, Dy, Dz),$$

$$Dx = \xi - x + \frac{a}{c}(g - h_2) - \frac{\alpha}{\gamma}(f - h_1),$$

$$Dy = \eta - y + \frac{b}{c}(g - h_2) - \frac{\beta}{\gamma}(f - h_1),$$

$$Dz = g - f \quad \text{and} \quad D = \sqrt{Dx^2 + Dy^2 + Dz^2};$$

$h_1$ denotes the height of a second reference plane above said first reference plane;

$h_2$ denotes the height of a third reference plane above said first reference plane;

x and y denote the geometrical location of each of the incident rays on said second reference plane;

$\xi$ and $\eta$ denote the geometrical location of each of the affected rays on said third reference plane;

$n_1$ denotes the optical index with respect to said incident rays;

$n_2$ denotes the optical index between said two unknown surfaces;

$n_3$ denotes the optical index with respect to said affected rays;

f denotes the height of one of said two unknown surfaces above said first reference plane;

g denotes the height of another of said two unknown surfaces above said first reference plane;

$(\alpha, \beta, \gamma)$ denotes the direction vector of each said incident rays; and (a, b, c) denotes the direction vector of each said affected rays.

14. The method according to claim 13, wherein said cost function is determined as $$E = \int [w_1(f_x - e1)^2 + w_2(f_y - e2)^2 + w_3(g_x - e3)^2 + w_4(g_y - e4)^2] dx dy,$$

and $w_i(x, y, f, g, \nabla f, \nabla g)$, i=1,2,3,4 are general weight functions.

* * * * *